US008374897B2

(12) United States Patent
MacGregor

(10) Patent No.: US 8,374,897 B2
(45) Date of Patent: Feb. 12, 2013

(54) APPARATUS AND METHOD FOR FORECASTING QUALITATIVE ASSESSMENTS

(75) Inventor: John Malcolm MacGregor, Ascot (GB)

(73) Assignee: Business Objects Software, Dublin (IE)

( * ) Notice: Subject to any disclaimer, the term of this patent is extended or adjusted under 35 U.S.C. 154(b) by 1136 days.

(21) Appl. No.: 11/444,597

(22) Filed: May 31, 2006

(65) Prior Publication Data
US 2007/0282648 A1 Dec. 6, 2007

(51) Int. Cl.
*G06Q 10/00* (2006.01)
(52) U.S. Cl. .................................. 705/7.11; 705/7.38
(58) Field of Classification Search ............... 705/10, 705/7.11, 7.38
See application file for complete search history.

(56) References Cited

U.S. PATENT DOCUMENTS

| | | | | | |
|---|---|---|---|---|---|
| 5,522,014 | A | * | 5/1996 | Clark et al. ............... | 706/45 |
| 5,774,121 | A | * | 6/1998 | Stiegler .................. | 715/769 |
| 6,094,651 | A | * | 7/2000 | Agrawal et al. ............. | 1/1 |
| 6,484,152 | B1 | * | 11/2002 | Robinson ................ | 705/36 R |
| 6,735,570 | B1 | * | 5/2004 | Lacy et al. ............... | 705/7.14 |
| 7,155,510 | B1 | * | 12/2006 | Kaplan .................. | 709/224 |
| 7,194,465 | B1 | * | 3/2007 | MacGregor .............. | 1/1 |
| 7,246,254 | B2 | * | 7/2007 | Alur et al. ............... | 714/2 |
| 7,707,062 | B2 | * | 4/2010 | Abramowicz ............. | 705/10 |
| 7,729,932 | B2 | * | 6/2010 | Yokota et al. ............. | 705/7 |
| 8,095,413 | B1 | * | 1/2012 | Beaven ................. | 705/7.38 |
| 2001/0032105 | A1 | * | 10/2001 | Frye et al. .............. | 705/7 |
| 2002/0059093 | A1 | * | 5/2002 | Barton et al. ............ | 705/10 |
| 2002/0194014 | A1 | * | 12/2002 | Starnes et al. ........... | 705/1 |
| 2003/0065535 | A1 | * | 4/2003 | Karlov et al. ............ | 705/2 |
| 2003/0200163 | A1 | * | 10/2003 | O'Riordan et al. ........ | 705/35 |
| 2004/0015377 | A1 | * | 1/2004 | Hostetler .............. | 705/7 |
| 2004/0039710 | A1 | * | 2/2004 | McMillan et al. ......... | 705/400 |
| 2004/0225556 | A1 | * | 11/2004 | Willen et al. ........... | 705/10 |
| 2005/0102175 | A1 | * | 5/2005 | Dudat et al. ............ | 705/10 |
| 2005/0131794 | A1 | * | 6/2005 | Lifson ................ | 705/36 |
| 2006/0089861 | A1 | * | 4/2006 | King et al. ............. | 705/4 |
| 2006/0149616 | A1 | * | 7/2006 | Hildick-Smith ........... | 705/10 |
| 2006/0242006 | A1 | * | 10/2006 | Hogan ................ | 705/14 |
| 2007/0129893 | A1 | * | 6/2007 | McColl et al. ........... | 702/19 |
| 2007/0282648 | A1 | * | 12/2007 | MacGregor ............. | 705/7 |

OTHER PUBLICATIONS

Levenbach, Hans. "Turning Marketing Data into Useful Forecasts." Production & Inventory Management Review & PICS News, vol. 11 No. 3, pp. 42-48, Mar. 1991.*
Auchey, Flynn L. and Auchey, gloria J. "Using Prism to Quantify Qualitative Data." AACE International Transactions, 2006, pp. RI11-RI17.*
Budrevicius, Algirdas. "Quanitative Forecasting Methods in Library Management." Univeristy of Vilnius, May 2004, http://www.ib.hu-berlin.de/aktuell/material/course_description_Budrevicius.pdf.*
Budrevicius, Dr. Algirdas. "Quantitative Forecasting Methods in Library Management." University of Vilnius, Lithuania, May 2004.*
CoHort Software. "CoStat's Statistical Procedures." <http://web.archive.org/web/20040610042154/http://www.cohort.com/costatstatistics.html>.*

(Continued)

*Primary Examiner* — Andre Boyce
*Assistant Examiner* — Renae Feacher
(74) *Attorney, Agent, or Firm* — Mintz, Levin, Cohn, Ferris, Glovsky and Popeo, P.C.

(57) ABSTRACT

A computer-readable medium to direct a computer to function in a specified manner includes executable instructions to: generate a set of qualitative assessments; convert the set of qualitative assessments into a set of quantitative assessments; produce a quantitative forecast from the set of quantitative assessments; and translate the quantitative forecast to a qualitative forecast.

15 Claims, 8 Drawing Sheets

OTHER PUBLICATIONS

Arsham, Hossein. "Time Series Analysis and Business Forecasting, Time-Critical Decision Making for Economics and Finance." 2004, <http://web.archive.org/web/20041014044047/http://home.ubalt.edu/ntsbarsh/stat-data/Forecast.htm>.*

Traub, Rodney D. and Dexter, Franklin."The Lack of Systematic Month-to-Month Variation Over One-Year Periods in Ambulatory Surgery Caseload—Application to Anesthesia Staffing." International Anesthesia Research Society, Anesth Analg 2000; 91:1426-1430.*

Liebhold, A.M. and Sharov, A. A."Testing for Correlation in the Presence of Spatial Autocorrelation in Insect Count Data." in "Population and Community Ecology for Insect Management and Conservation", Rotterdam, 1998.*

Villardi, Beatriz."Embedded Case Study Methods: Integrating Quantitative and Qualitative Knowledge," Management Learning, Sep. 2003, 34, 3, Proquest Centrap p. 398.*

Singh, Sameer."Pattern Modelling in Time-Series Forecasting," Cybernetics and Systems—An International Journal, vol. 31, issue 1, 2000.*

Smart, Charles N.,"Bootstrap Your Way to Better Forecasts," Midrange Enterprise, Jan. 2001.*

Gronholdt, Lars and Martensen, Anne,"Analyzing customer statisfaction data: a comparison of regression and artificial nueral networks," International Journal of Market Research, vol. 47, Issue 2, 2005.*

Nardo, Michela,"The quantification of qualitative survey data: a critical assessment," Journal of Economic Surveys, vol. 17, No. 5.*

Smith, Jeremy and Mcaleer, Michael,"Alternative procedures for converting qualitative response data to quantitative expectations: An application to australian manufacturing" Journal of Applied Econometrics, vol. 10, 165-195 (1995).*

* cited by examiner

| Mapping | |
|---|---|
| 306 — Very Good | 5 — 402 |
| Good | 4 |
| OK | 3 |
| Bad | 2 |
| Very Bad | 1 |

| Quantitative Forecast | Jan | Feb | Mar | Apr | May | Jun |
|---|---|---|---|---|---|---|
| Strategic Initiatives | | | | | | |
| Total Quality Management | 2 | 2 | 2 | 3 | 3 | 4 |
| Employee Review System | 4 | 5 | 3 | 3 | 3 | 2 |
| Customer Advisory Board | 3 | 4 | 3 | 4 | 4 | 4 |

| Quantitative Forecast | Jan | Feb | Mar | Apr | May | Jun | Jul | Aug | Sep |
|---|---|---|---|---|---|---|---|---|---|
| Strategic Initiatives | | | | | | | | | |
| Total Quality Management | 2 | 2 | 2 | 3 | 3 | 4 | 4.0667 | 4.4667 | 4.8670 |
| Employee Review System | 4 | 5 | 3 | 3 | 3 | 2 | 1.7333 | 1.2762 | 0.8190 |
| Customer Advisory Board | 3 | 4 | 3 | 4 | 4 | 4 | 4.2667 | 4.4381 | 4.6095 |

FIG. 6

| Round Forecast | | | | | | | Jul | Aug | Sep |
|---|---|---|---|---|---|---|---|---|---|
| Total Quality Management | | | | | | | 4 | 4 | 5 |
| Employee Review System | | | | | | | 2 | 1 | 1 |
| Customer Advisory Board | | | | | | | 4 | 4 | 5 |

|  | Actual Jan | Actual Feb | Actual Mar | Actual Apr | Actual May | Actual Jun | Forecast Jul | Forecast Aug | Forecast Sep |
|---|---|---|---|---|---|---|---|---|---|
| Strategic Initiatives | | | | | | | | | |
| Total Quality Management | ◯ | ◯ | ◯ | ◇ | ◇ | ◯ | ◯ | ◯ | ◯ |
| Employee Review System | ◯ | ◯ | ◇ | ◇ | ◇ | ◯ | ◯ | ● | ● |
| Customer Advisory Board | ◇ | ◯ | ◇ | ◯ | ◯ | ◯ | ◯ | ◯ | ◯ |

APPARATUS AND METHOD FOR FORECASTING QUALITATIVE ASSESSMENTS

BRIEF DESCRIPTION OF THE INVENTION

The present invention relates generally to data processing. More particularly, the present invention relates to a technique for forecasting qualitative assessments in performance management.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems, such as relational databases or On Line Analytic Processing (OLAP) systems used to collect, store, and manage raw data.

There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

The present invention relates to the analytical and reporting aspects of BI. Analyzing and predicting the effect that business records have on an enterprise has become increasingly more valuable and complex. A business record or business data value is a measure of the performance of an enterprise (e.g., commercial, governmental, non-profit, etc.). The business data value may be quantitative (e.g., revenue, headcount, customer satisfaction index, etc.) or qualitative (e.g., strategic initiatives, strategic projects, action plans, etc.). While there are existing tools that exploit quantitative business records as a predictive driver to evaluate the future performance of an enterprise, these tools do not utilize qualitative business records.

Therefore, it would be desirable to provide a new technique that efficiently utilizes qualitative business data values as a predictive tool in assessing the future performance of a business. In particular, it would be desirable to provide a method to forecast future qualitative business records for an enterprise.

SUMMARY OF THE INVENTION

The invention includes a computer-readable medium to direct a computer to function in a specified manner. The computer-readable medium stores executable instructions to: generate a set of qualitative assessments; convert the set of qualitative assessments to a set of quantitative assessments; produce a quantitative forecast from the set of quantitative assessments; and translate the quantitative forecast to a qualitative forecast.

The invention also includes a computer implemented method of processing data, comprising: generating a set of qualitative assessments; converting the set of qualitative assessments to a set of quantitative assessments; producing a quantitative forecast; and translating the quantitative forecast back to a qualitative forecast.

BRIEF DESCRIPTION OF THE DRAWINGS

For a better understanding of the nature and objects of the invention, reference should be made to the following detailed description taken in conjunction with the accompanying drawings, in which:

FIG. 4 illustrates an exemplary mapping for the set of qualitative assessments of FIG. 3.

FIG. 5 illustrates the application of the mapping of FIG. 4 to the qualitative assessments of FIG. 3.

FIG. 6 illustrates the results of the forecast made for the set of quantitative assessments of FIG. 5.

FIG. 7 illustrates the results of rounding the quantitative forecast of FIG. 6.

FIG. 8 illustrates the qualitative forecast converted from the quantitative forecast of FIG. 7.

DETAILED DESCRIPTION OF THE INVENTION

Figure 1:
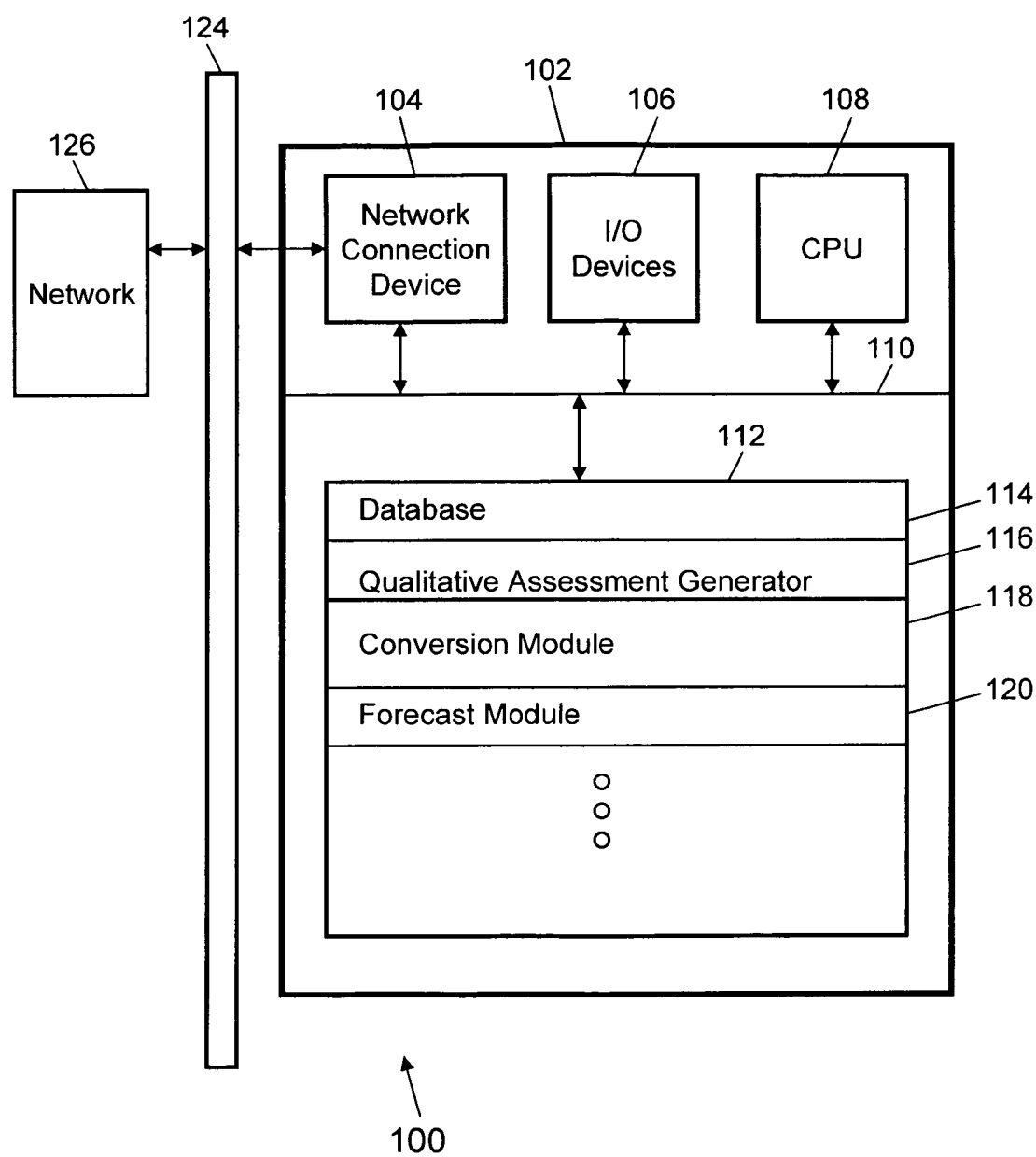
FIG. 1 illustrates a computer that may be operated in accordance with an embodiment of the invention.

FIG. 1 illustrates a computer network 100 that may be operated in accordance with an embodiment of the invention. The computer network 100 includes a computer 102, which, in general, may be a client computer or a server computer. In the present embodiment of the invention, the computer 102 is a server computer including conventional server computer components. As shown in FIG. 1, the computer 102 includes a Central Processing Unit ("CPU") 108 that is connected to a network connection device 104 and a set of input/output devices 106 (e.g., a keyboard, a mouse, a display, a printer, a speaker, and so forth) via a bus 110. The network connection device 104 is connected to network 126 through a network transport medium 124, which may be any wired or wireless transport medium.

The CPU 108 is also connected to a memory 112 via the bus 110. The memory 112 stores a set of executable programs. One executable program is the qualitative assessment generator 116. The qualitative assessment generator 116 includes executable instructions to access a data source to produce a set of qualitative assessments. A qualitative assessment is a representation of a qualitative business data value. A set of qualitative business records is a collection of qualitative business data values. The business data values may be recorded for one or more given variables at different periods over time. By way of example, the data source may be database 114 resident in memory 112. The data source may be located anywhere in the network 126.

As shown in FIG. 1, the memory 112 also contains a conversion module 118. The conversion module 118 enables bi-directional conversion between qualitative business records and quantitative business records. The conversion module 118 includes executable instructions to access a data source to convert a set of business data values. By way of example, the data source may be database 114 resident in memory 112. FIG. 1 also shows that memory 112 contains a forecast module 120. The forecast module 120 analyzes business data values to produce a forecast of future business records of an enterprise. In one embodiment of the invention, the forecast module 120 produces a qualitative forecast using the business data values generated by the conversion module 118 according to the processing operations illustrated in FIG. 2.

While the various components of memory 112 are shown residing in the single computer 102, it should be recognized that such a configuration is not required in all applications. For instance, the conversion module 118 may reside in a separate computer (not shown in FIG. 1) that is connected to the network 126. Similarly, separate modules of executable code are not required. The invention is directed toward the operations disclosed herein. There are any number of ways and locations to implement those operations, all of which should be considered within the scope of the invention.

Figure 2:
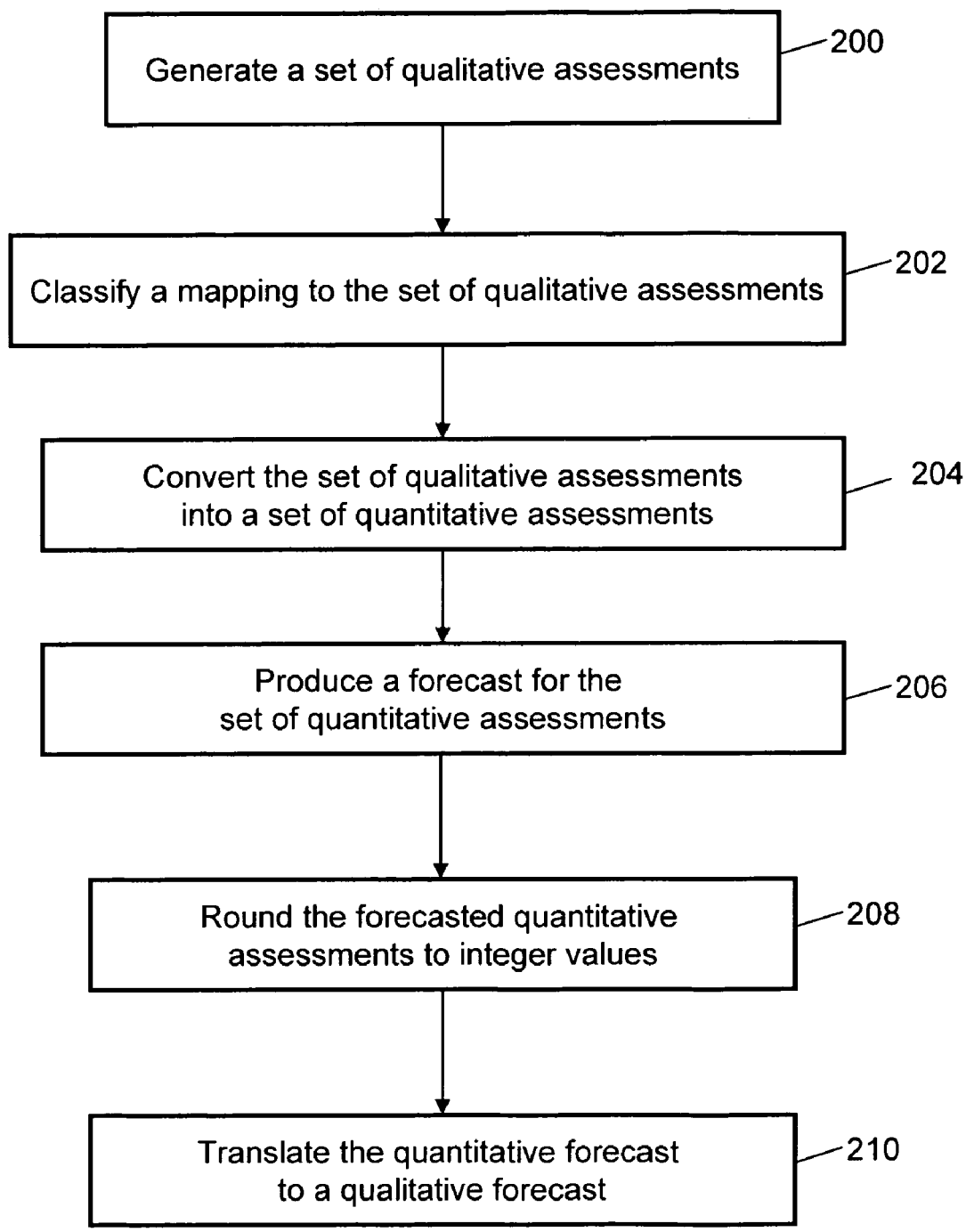
FIG. 2 illustrates processing operations performed in accordance with an embodiment of the invention.
Figure 3:
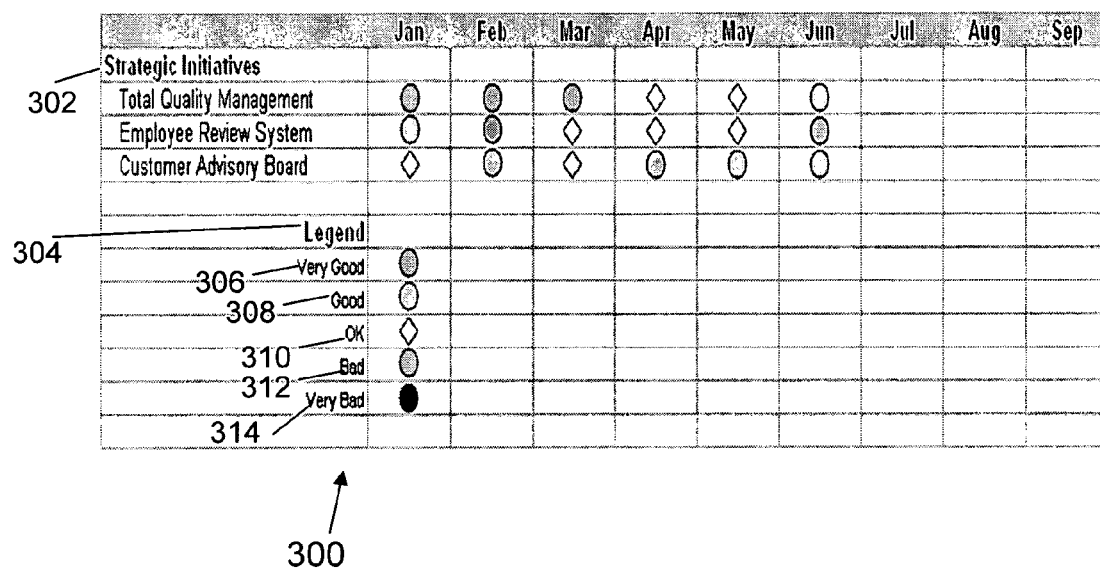
FIG. 3 illustrates an exemplary set of qualitative assessments.

FIG. 2 illustrates processing operations associated with an embodiment of the invention. The first processing operation shown in FIG. 2 is to generate a set of qualitative assessments 200. In one embodiment of the invention, this is implemented with executable code of the qualitative assessment generator 116. By way of example, the qualitative assessment generator 116 may generate a set of qualitative assessments for different variables recorded over a specified number of periods. For example, FIG. 3 illustrates a set of qualitative assessments 300 for strategic initiatives 302 recorded at various months. FIG. 3 also displays a legend 304 that correlates each qualitative business data value to a respective qualitative assessment (e.g. Very Good 306, Good 308, OK 310, Bad 312 and Very Bad 314) that may be defined by the user. Thus, a set of qualitative assessments characterizes various qualitative business data values over a specified number of periods. Similarly, a set of quantitative assessments characterizes various quantitative business data values over a specified number of periods.

As shown in FIG. 2, the next processing operation is to classify a mapping to the set of qualitative assessments 202. The conversion module 118 may provide a mapping that is to be applied to the set of qualitative assessments generated by the qualitative assessment generator 116. For instance, FIG. 4 illustrates a mapping 400 that is to be applied to the set of qualitative assessments 300 of FIG. 3. A quantitative value is attached to each qualitative assessment identified in the set of qualitative assessments. To illustrate, the qualitative assessment Very Good 306 was mapped to a quantitative value of 5 402. Any type of transformation may be used provided that the same transformation is used to re-transform the quantitative forecast data, subsequently produced, into qualitative assessments.

Returning to FIG. 2, the next processing operation is to convert the set of qualitative assessments into a set of quantitative assessments 204. The conversion module 118 may convert the set of qualitative assessments into quantitative assessments using the mapping provided by the conversion module 118. The mapping of quantitative assessments is applied to the qualitative assessments to produce converted values. For example, FIG. 5 illustrates the results 500 of applying the mapping 400 of FIG. 4 to the set of qualitative assessments 300 of FIG. 3. Each of the qualitative assessments in the set of qualitative assessments is assigned a quantitative assessment based on the defined mapping.

As shown in FIG. 2, the next processing operation is to produce a forecast for the set of quantitative assessments 206. The forecast module 120 produces a forecast for the set of quantitative assessments converted by the conversion module 118. The forecast module 120 may identify any exemplary patterns that are present in the set of quantitative assessments converted by the conversion module 118 to produce a forecast. By way of example, exemplary patterns that may be identified by the forecast module 120 include linear positive patterns, linear negative patterns, non-linear positive patterns, non-linear negative patterns, cyclical patterns, and random behavior patterns. These patterns can be identified using the techniques described in the commonly owned patent application entitled "Apparatus and Method for Identifying Patterns in a Multi-Dimensional Database", Ser. No. 10/113,917, filed Mar. 28, 2002.

Various statistical tests may also be applied. For example, the invention may be implemented using Runs Test, a Mean Successive Squared Difference Test, an Autocorrelation Test, a Tukey Test, a Variance Test, or a Regression Analysis.

FIG. 6 illustrates the results of the forecast made for the set of quantitative assessments 600 of FIG. 5. The forecast module 120 employed a linear regression to forecast business records for the months of July 602, August 604, and September 606. Nonetheless, those skilled in the art will appreciate that various forecasting algorithms may be used, each of which should be considered within the scope of the invention.

Returning to FIG. 2, the next processing operation is to round the forecasted quantitative assessments to integer values 208, according to the mapping used in the example. In one embodiment of the invention, the conversion module 118 may round the forecasted quantitative business data values produced by the forecast module 118 to the nearest integer value. For instance, FIG. 7 illustrates the results of rounding the forecasted business data values 700 of FIG. 6 for the months of July 602, August, 604, and September 606. In this example, each quantitative business data value is rounded to the nearest integer. The rounding will reflect the mapping chosen for the qualitative to quantitative conversion.

The last processing operation shown in FIG. 2 is to translate the quantitative forecast to a qualitative forecast 210. The conversion module 118 may use the mapping provided earlier to convert the rounded quantitative forecast into a qualitative forecast. For example, FIG. 8 illustrates the forecasted qualitative assessments 800 converted from the rounded forecasted quantitative assessments 700 of FIG. 7, along with the previously recorded set of qualitative assessments 300. The user may now view a forecast made for a set of recorded qualitative assessments. The forecast may be used to predict future business performance. Ultimately, this enables the user to structure business actions or responses in conjunction with the forecasted data.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt to a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

What is claimed is:

1. A non-transitory computer-readable storage medium to direct a computer to function in a specified manner, comprising executable instructions to:
generate a set of qualitative assessments for different variables within a data set recorded over a specified number of periods among a plurality of business records;
convert the set of qualitative assessments to a corresponding set of quantitative assessments using a pre-defined mapping between qualitative assessment values in the set of qualitative assessments and numeric values;
identify, using a statistical test, at least two patterns present in the set of quantitative assessments, each pattern being a relationship between a plurality of data values, the statistical test being selected from a group consisting of: a Runs Test, a Mean Successive Squared Difference Test, an Autocorrelation Test, a Tukey Test, a Variance Test, and a Regression Analysis, the patterns being selected from a group consisting of: a linear pattern, a non-linear pattern, an outlier pattern, a cyclical pattern, and a random pattern;
produce a quantitative forecast predicting future business performance from the set of quantitative assessments using the identified patterns;
translate the quantitative forecast, using the pre-defined mapping, to a qualitative forecast predicting future business performance that provides a textual or graphical characterization of a record; and
initiate display of the qualitative forecast.

2. The non-transitory computer-readable storage medium of claim 1, wherein the qualitative assessments are based on business records selected from a group consisting of: strategic initiatives records, strategic projects records, and action plans.

3. The non-transitory computer-readable storage medium of claim 1, wherein the pre-defined mapping is a user defined mapping.

4. The non-transitory computer-readable storage medium of claim 1, wherein the executable instructions to translate include executable instructions to round the quantitative forecast.

5. The non-transitory computer-readable storage medium of claim 1, wherein the executable instructions include executable instructions to display the qualitative forecast.

6. A method for implementation by one or more data processors comprising:
generating, by at least one data processor, a set of qualitative assessments for different variables within a data set recorded over a specified number of periods among a plurality of business records;
converting, by at least one data processor, the set of qualitative assessments to a corresponding set of quantitative assessments using a pre-defined mapping between qualitative assessment values in the set of qualitative assessments and numeric values;
identifying, by at least one data processor using a statistical test, at least two patterns present in the set of quantitative assessments, each pattern being a relationship between a plurality of data values, the statistical test being selected from a group consisting of: a Runs Test, a Mean Successive Squared Difference Test, an Autocorrelation Test, a Tukey Test, a Variance Test, and a Regression Analysis, the patterns being selected from a group consisting of: a linear pattern, a non-linear pattern, an outlier pattern, a cyclical pattern, and a random pattern;

producing, by at least one data processor, a quantitative forecast predicting future business performance from the set of quantitative assessments using the identified patterns;

translating, by at least one data processor, the quantitative forecast, using the pre-defined mapping, to a qualitative forecast predicting future business performance that provides a textual or graphical characterization of a record; and initiating, by at least one data processor, display of the qualitative forecast.

7. The method of claim 6, wherein the qualitative assessments are based on business records selected from a group consisting of: strategic initiatives records, strategic projects records, and action plans.

8. The method of claim 6, wherein the pre-defined mapping is a user defined mapping.

9. The method of claim 6, wherein the translating comprises rounding the quantitative forecast.

10. The method of claim 6, further comprising: displaying, by at least one data processor, the qualitative forecast.

11. A system comprising:
one or more data processors; and
memory storing instructions, which when executed, result in operations comprising:
generating, by at least one data processor, a set of qualitative assessments for different variables within a data set recorded over a specified number of periods among a plurality of business records;

converting, by at least one data processor, the set of qualitative assessments to a corresponding set of quantitative assessments using a pre-defined mapping between qualitative assessment values in the set of qualitative assessments and numeric values;

identifying, by at least one data processor using a statistical test, at least two patterns present in the set of quantitative assessments, each pattern being a relationship between a plurality of data values, the statistical test being selected from a group consisting of: a Runs Test, a Mean Successive Squared Difference Test, an Autocorrelation Test, a Turkey Test, a Variance Test, and a Regression Analysis, the patterns being selected from a group consisting of: a linear pattern, a non-linear pattern, an outlier pattern, a cyclical pattern, and a random pattern;

producing, by at least one data processor, a quantitative forecast predicting future business performance from the set of quantitative assessments using the identified patterns;

translating, by at least one data processor, the quantitative forecast, using the pre-defined mapping, to a qualitative forecast predicting future business performance that provides a textual or graphical characterization of a record; and initiating, by at least one data processor, display of the qualitative forecast.

12. The system of claim 11, wherein the qualitative assessments are based on business records selected from a group consisting of: strategic initiatives records, strategic projects records, and action plans.

13. The system of claim 11, wherein the pre-defined mapping is a user defined mapping.

14. The system of claim 11, wherein the translating comprises rounding the quantitative forecast.

15. The system of claim 11, wherein the operations further comprise: displaying, by at least one data processor, the qualitative forecast.

* * * * *